US010964109B1

(12) United States Patent
Fatakhov

(10) Patent No.: US 10,964,109 B1
(45) Date of Patent: Mar. 30, 2021

(54) METHOD FOR CREATING AN EXACT DIGITAL REPLICA OF A VEHICLE

(71) Applicant: LENFLASH.COM, CORP., New York, NY (US)

(72) Inventor: Moysey Fatakhov, New York, NY (US)

(73) Assignee: LENFLASH.COM, CORP., New York, NY (US)

( * ) Notice: Subject to any disclaimer, the term of this patent is extended or adjusted under 35 U.S.C. 154(b) by 16 days.

(21) Appl. No.: 16/661,779

(22) Filed: Oct. 23, 2019

(51) Int. Cl.
*G06T 19/00* (2011.01)
*G06T 17/20* (2006.01)

(52) U.S. Cl.
CPC .......... *G06T 19/003* (2013.01); *G06T 17/20* (2013.01)

(58) Field of Classification Search
CPC .............................. G06T 19/003; G06T 17/20
See application file for complete search history.

(56) References Cited

U.S. PATENT DOCUMENTS

| | | | | |
|---|---|---|---|---|
| 10,832,476 | B1* | 11/2020 | Nussbaum | G06K 9/00214 |
| 2017/0148102 | A1* | 5/2017 | Franke | G06Q 30/0278 |
| 2017/0251143 | A1* | 8/2017 | Peruch | H04N 13/243 |
| 2019/0095877 | A1* | 3/2019 | Li | G06Q 10/20 |
| 2019/0164445 | A1* | 5/2019 | Guillemette | G01S 13/89 |
| 2019/0179320 | A1* | 6/2019 | Pacala | G01C 21/20 |

OTHER PUBLICATIONS

"Capture, share, and collaborate in immersive 3D | Matterporort"; accessed on Aug. 4, 2020; <https://matterport.com>.
"Vroom: Buy, Sell or Trade-In Used Vehicles Online"; accessed on Aug. 4, 2020; <https://www.vroom.com>.
"Used and New Car Sales, Review"; accessed on Aug. 4, 2020; <https://www.autotrader.com/>.
"Carvana | Buy & Finance Used Cars Online | At Home Delivery"; accessed on Aug. 4, 2020; <https://www.carvana.com>.

* cited by examiner

*Primary Examiner* — Xin Sheng
(74) *Attorney, Agent, or Firm* — MG Miller Intellectual Property Law LLC

(57) ABSTRACT

A method for creating a complete three-dimensional model of a vehicle, along with a corresponding virtual tour and means for navigating said model is disclosed.

13 Claims, 2 Drawing Sheets

METHOD FOR CREATING AN EXACT DIGITAL REPLICA OF A VEHICLE

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

CLAIM OF PRIORITY

This application does not claim priority to any patent or patent application.

FIELD OF THE EMBODIMENTS

The present disclosure relates generally to a method for creating a complete interactive three-dimensional virtual model of a vehicle.

BACKGROUND

Deciding to purchase a vehicle is a large financial decision for a person to make. There are many different aspects that need to be considered when making such a big purchase that often get overlooked. Many vehicle trading services do not include what is actually important for a trader to be aware of when buying a car. Customers may know the make and model they want, but the model year is also important. Different model years can have varying features that are part of the car. Customers may not always get to see the exact year model they intend to buy until they are ready to pick up their purchased new car.

The market is infiltrated with companies that advertise various cars for sale. The issue is that many of these businesses show photos and graphics of the generic make and model for the car up for sale. Each car has its own story though. A particular car for sale may have had an accident and had the front bumper replaced, or maybe there is a small stain on one of the seats. These details are important for the consumer to be aware of before purchasing the car. A consumer should be able to view the car they are actually intending to purchase. A generic photo does not give an accurate depiction of the actual car.

The automotive industry is notoriously known to try and trick customers looking to purchase a new car. Customers are often sold "lemons" by dealers despite being shown photos of the car, however having an accurate depiction of a vehicle will instill a sense of trust in car dealers. The value of the cars will also increase by having these photos be more representative. Dealers would no longer need to reduce the price due to imperfections the consumer found upon physically seeing the car. All of the car's blemishes will be available for the customer to see beforehand so there are no more surprises that can often associated with car shopping.

Additionally, none of the companies on the market now have a way to view the car as if the consumer was there in person. Even if there are 3D models available, they lack the interactivity and detail that are crucial for a customer to be able to make such a big decision. There is a need for a 3D model that has increased detail as well as a number of perspectives to view the car. A consumer should be able to feel as though they are actually touring the physical car to be able to best evaluate it. This will create more security for the customer as they will know exactly the car they are getting including any imperfections that may exist. Transparency is important for a purchase this large.

SUMMARY

The present disclosure provides for a method for creating a three-dimensional complete virtual model of a real-world vehicle from a collection of images taken at a series of points, where each point is marked by one of a plurality of physical markers. The method begins by first determining a placement destination for each of the plurality of physical markers, where the plurality of physical markers are placed in a predetermined formation around the vehicle, where the predetermined formation pertains to the size of the vehicle. The method then proceeds to determine an amount of levels required to create the three-dimensional complete virtual model and then to determine height for a portion of the collection of images to be taken from. From there, a first portion of images is captured by placing an image-capture device at the height and capturing an image at each of the plurality of physical markers, to create a level. These steps are repeated for each level required to completely capture the vehicle. In various embodiments, the resolution of the images captured is at least 3840 pixels by 1920 pixels. Preferably, between two and six levels will be used, where larger vehicles require more levels.

Once the images have been taken, a predetermined schema is applied to each of the captured images to categorize how each captured images relates to one-another to create an image mesh. A navigation grid comprising a series of hyperlinks where each hyperlink provides for the rendering of a different captured image and is optionally superimposed over the image mesh. The three-dimensional complete virtual model of the real-world vehicle is created by incorporating the plurality of captured images, the image mesh, and the navigation grid, such that an end-user will be able to visualize and navigate through the three-dimensional complete virtual model.

In various embodiments, the above method is repeated where the vehicles doors are open, allowing for an alternative three-dimensional complete virtual model of the real-world vehicle. In some embodiments, an end-user may toggle between the two models, as desired. While many suitable image-capture devices exist, preferably the image-capture device used by the method is a three-dimensional camera. When desired, it is possible to create templates, automating the determined positions of the placement of the physical markers, the horizontal distance, and the vertical distance is predetermined, based on the make and model of a vehicle. Alternatively, templates can be prepared based on the kind of vehicle, such as a sedan, a helicopter, or a motorcycle.

The horizontal distance of the placement markers is proportional to the size and type of the vehicle. That is, the larger the vehicle, the larger the horizontal distance will be, in order to ensure that a sufficient amount of the vehicle is captured by the image-capture device. In many embodiments, this horizontal distance is within the range of 4 feet to 15 feet. Similarly, the vertical distance is proportional to the size and type of the vehicle. Again, the larger the vehicle, the larger the vertical distance shall be to ensure that the entirety of the vehicle is captured by the image-capture device. Preferably, the vertical distance or height is within the range of 20 inches to 50 inches, and more preferably within the range of 10 inches to 30 inches. Many types of vehicles can have three-dimensional complete virtual models created. Such vehicles include cars, mopeds, motorcycles, boats, airplanes, busses, trucks, vans, tractors, and jet skis.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

BRIEF DESCRIPTION OF THE PREFERRED EMBODIMENTS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete, and fully conveys the scope of the present disclosure to those skilled in the art. In fact, it will be apparent to those skilled in the art that various modifications and variations can be made in the present invention without departing from the scope or spirit of the invention.

DETAILED DESCRIPTION OF THE PREFERRED EMBODIMENTS

The present disclosure contemplates an algorithm for creating a complete three-dimensional model of a vehicle, along with a corresponding virtual tour and means for navigating said model.

Figure 1:
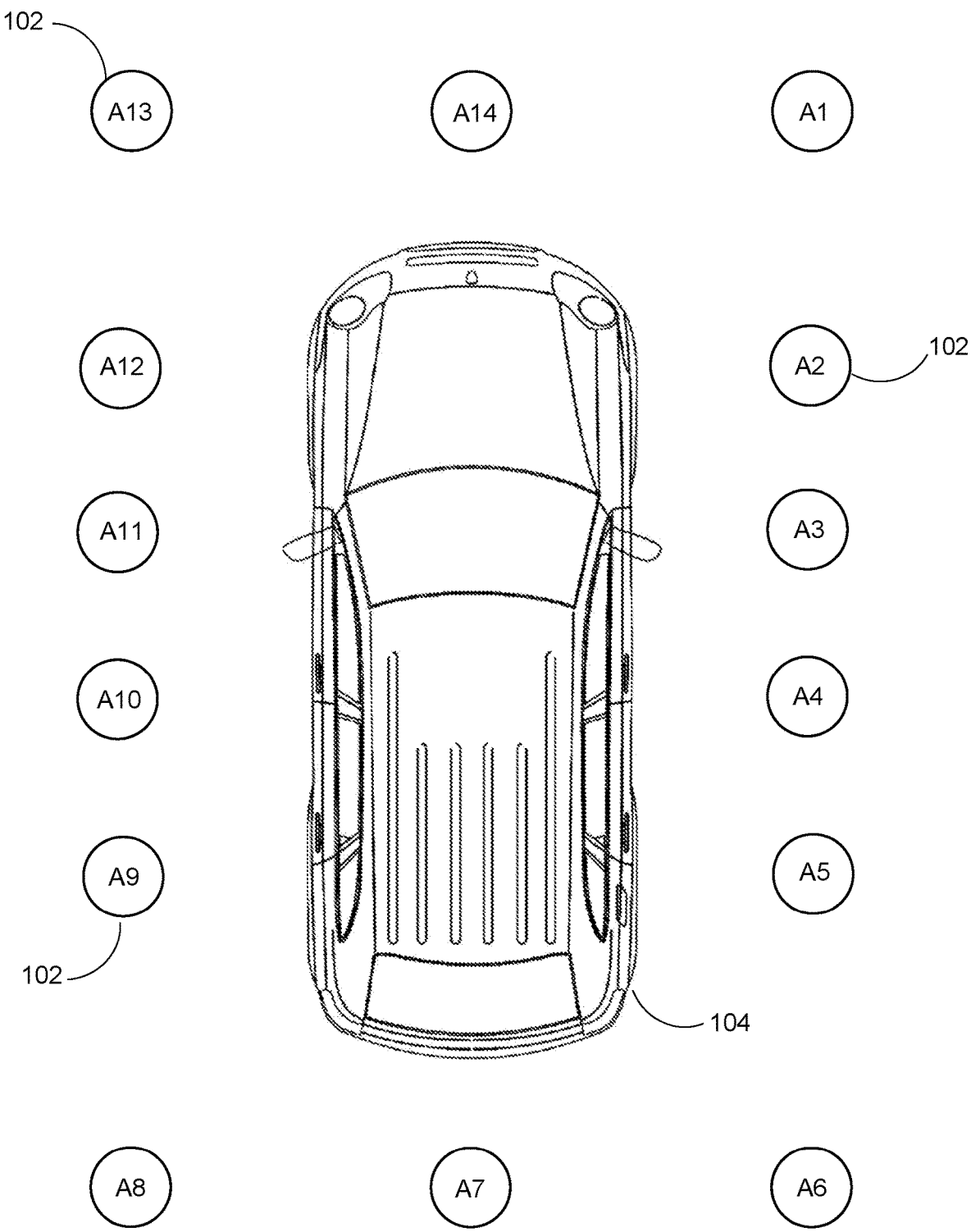
FIG. 1 is a top view showing an embodiment of the placement markers in relation to an example vehicle accordance with the present disclosure.

Referring to FIG. 1, a top view showing the placement of a plurality of physical markers 102 in relation to a vehicle 104 is shown. These physical markers are placed in a formation around the vehicle such that when an image is captured from each of those locations, at the appropriate height, no portion of the exterior of the vehicle will go uncaptured. The use of physical markers is beneficial because it allows unskilled laborers to perform the method, enabling non-technically-oriented vehicle owners to create the complete three-dimensional models in accordance with the present disclosure. In many embodiments, the physical markers have a top surface and a bottom surface. Preferably, the top surface is marked with a numerical indicator, which corresponds to a shooting scheme used by the method. In some embodiments, the bottom surface is equipped with a non-slip material to help secure the physical markers to the ground, after being placed in their appropriate location.

The placement of each of the physical markers can be predefined by a template. Templates can correlate to a specific make and model of a vehicle, or can pertain to a particular class of vehicle, such as a sedan, depending on user preferences. Templates can also correlate to a body type of a vehicle, such as a small, mid-size, or full size, sedan, or other type of vehicle. Templates can also exist to assist an end-user with capturing images of the interior of the vehicle. In a highly preferred embodiment, the captured images have an aspect ratio of 2:1, and a resolution of 3840 pixels by 1920 pixels.

Each physical marker shows the locations where the image capture device should be placed. When performing the method, images are captured at the position of each physical marker at various heights, and a collection of images captured at the same height is referred to as a level. It will require multiple levels to adequately capture enough images to create the complete three-dimensions model of the vehicle. Preferably, the captured images shall consist of at least 8 images taken per level, with 20 images taken in the level where the vehicle's doors are opened, at least four images of the interior of the vehicle with the doors closed, and at least one image of the interior of the vehicle with the doors open.

Figure 2:
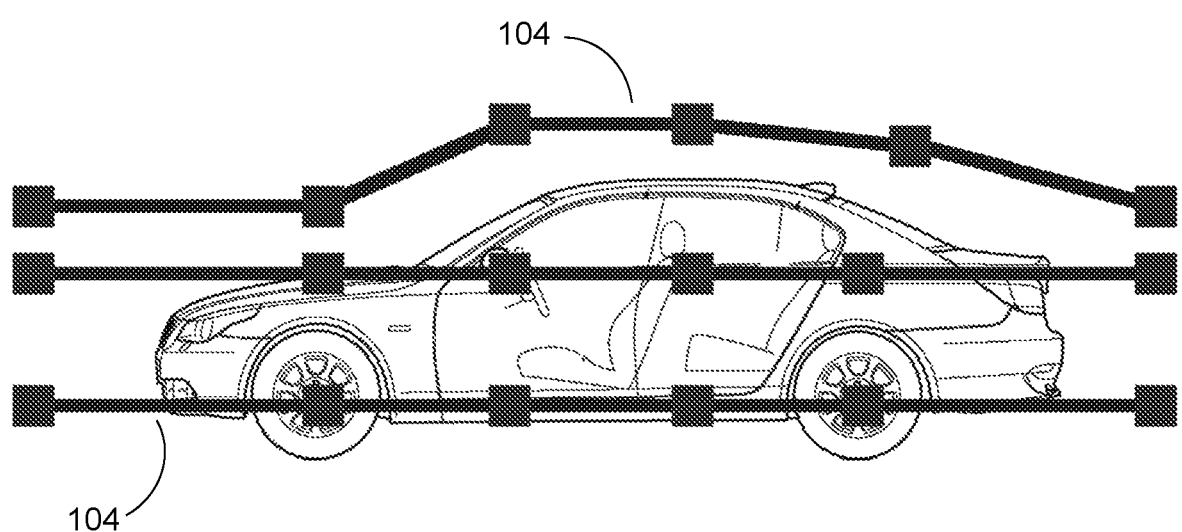
FIG. 2 is a side view showing an embodiment of where the image-capture device should be placed in relation to an example vehicle accordance with the present disclosure.

Referring to FIG. 2, a side view showing an embodiment of a shooting scheme for where the image-capture device should be placed in relation to an example vehicle is disclosed. Specifically, FIG. 2. shows a series of example heights that the image-capture device should be placed at, where each height corresponds to a single level 104 to be used with the method in accordance with the present disclosure. In a highly preferred embodiment, a single level 104 is created where the vehicle's doors are opened, allowing an end-user to toggle between an "open door" and "closed door" model of the vehicle.

Once the required images have been captured, a navigation pattern is created. Each navigation patterns depends on the body type of each vehicle, and the navigation pattern corresponds to a schema. Preferably, the schema shall user numerical characters for each of the physical markers, and alphabetical characters for each of the levels, which, when taken together are used to create a navigation grid. By using a predefined schema, it allows end-users to easily create these complete three-dimensional models without the need of technical prowess.

The navigation grid is comprised of a number of cells, where each cell corresponds to one of the captured images in a one-to-one relationship. When a user clicks on one of the cells in a navigation grid, they are directed to the corresponding captured image, and are presented with said image, where they can click to other portion of the navigation grid, as desired. In many embodiments, the navigation grid is made transparent to provide for a natural browsing experience.

In many embodiments, a virtual joystick is employed to assist an end-user with navigating the complete three-dimensional model of the vehicle. The virtual joystick will also allow the user to rotate the car, open or close the doors of the virtual model, and rotation with through the use of digital push pins overlaid on the mesh. Any additional close-up images or videos will display additional information about the vehicle, such as the make, model, number of miles driven, and other salient information that the end-user uploads. In other embodiments, the complete interactive three-dimensional model will allow an end-user to initiate an autoplay sequence which shall iterate through all of the captured images. This autoplay sequence may iterate through all of the captured images, or may cycle through a series of user-selected images. The virtual joystick will also allow the user to rotate the car, open or close the doors of the virtual model, and will display additional information about the vehicle, such as make, model, number of miles driven, and other salient information that the end-user uploads.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, "a first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a disclosure that relates generally to a method for creating a complete interactive three-dimensional virtual model of a vehicle through the use of physical placement markers such than an unskilled worker is capable of performing the method with little or no training. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method for creating a three-dimensional complete virtual model of a real-world vehicle from a collection of images taken at a series of points, where each point is marked by one of a plurality of physical markers, comprising the steps of:
   a) determining a placement destination for each of the plurality of physical markers, wherein the plurality of physical markers are placed in a predetermined formation around the real-world vehicle;
   b) determining an amount of levels required to create the three-dimensional complete virtual model;
   c) determining a height for a first portion of the collection of images to be taken from;
   d) creating a level by capturing, by an image-capture device, the first portion of images by placing the image-capture device at the height and capturing one image at each of the plurality of physical markers;
   e) repeating steps c and d an amount of times equal to the number of levels determined in step b;
   f) creating an image mesh by applying a predetermined schema to each of the levels to categorize how each image within each level relates to one-another;
   g) generating a navigation grid, the navigation grid comprising a series of hyperlinks overlaid on the image mesh, wherein each hyperlink provides means for loading and rendering one of the captured images from step d; and
   h) creating the three-dimensional complete virtual model of the real-world vehicle by incorporating the plurality of captured images from step d, the image mesh, and the navigation grid, such that an end-user will be able to visualize and navigate through the three-dimensional complete virtual model by clicking through the navigation grid.

2. The method of claim 1, further comprising the step of repeating steps c, d, and e where the real-world vehicle has open doors.

3. The method of claim 2, wherein the image-capture device is a three-dimensional camera.

4. The method of claim 3, wherein each captured image has a resolution of at least 3840 pixels by 1920 pixels.

5. The method of claim 4, further comprising the step of creating a template, based on the determinations of steps a, b, and c.

6. The method of claim 5, wherein the amount of levels is in the range of 1 level to 6 levels.

7. The method of claim 6, the placement destination being correlated to a horizontal distance from the real-world vehicle.

8. The method of claim 7, wherein the horizontal distance is in the range of 4 feet to 15 feet.

9. The method of claim 8, wherein the height is in the range of 10 inches to 30 inches.

10. The method of claim 8, wherein the height is in the range of 20 inches to 50 inches.

11. The method of claim 8, wherein the amount of levels is greater than 1 level.

12. The method of claim 11, wherein the real-world vehicle is selected from the group consisting of: cars, mopeds, motorcycles, boats, airplanes, busses, trucks, vans, tractors, and jet skis.

13. The method of claim 12, further comprising the step of providing a virtual joystick which allows the end-user to navigate the three-dimensional complete model in a complete 360 degrees.

\* \* \* \* \*